US011260338B2

(12) United States Patent
Maxwell

(10) Patent No.: US 11,260,338 B2
(45) Date of Patent: Mar. 1, 2022

(54) OXYGEN GENERATION DEVICE

(71) Applicant: O2 Air-Sea, LLC, Decatur, AL (US)

(72) Inventor: Johnny Maxwell, Decatur, AL (US)

(73) Assignee: O2 AIR-SEA, LLC, Decatur, AL (US)

( * ) Notice: Subject to any disclaimer, the term of this patent is extended or adjusted under 35 U.S.C. 154(b) by 874 days.

(21) Appl. No.: 16/059,840

(22) Filed: Aug. 9, 2018

(65) Prior Publication Data
US 2020/0047109 A1 Feb. 13, 2020

(51) Int. Cl.
*B01D 53/02* (2006.01)
*B01D 53/04* (2006.01)
*B01D 53/047* (2006.01)
*A01K 97/20* (2006.01)
*A01K 63/04* (2006.01)
*A01K 97/05* (2006.01)

(52) U.S. Cl.
CPC ....... *B01D 53/0446* (2013.01); *B01D 53/047* (2013.01); *A01K 63/042* (2013.01); *A01K 97/05* (2013.01); *A01K 97/20* (2013.01); *B01D 2256/12* (2013.01); *B01D 2257/102* (2013.01); *B01D 2259/402* (2013.01); *B01D 2259/40003* (2013.01); *B01D 2259/40007* (2013.01); *B01D 2259/45* (2013.01)

(58) Field of Classification Search
CPC ...... A01K 63/042; A01K 97/05; A01K 97/20; B01D 2256/12; B01D 2257/102; B01D 2259/40003; B01D 2259/40007; B01D 2259/402; B01D 2259/45; B01D 53/0415; B01D 53/0446; B01D 53/047; C01B 13/00
See application file for complete search history.

(56) References Cited

U.S. PATENT DOCUMENTS

| 3,975,269 | A | 8/1976 | Ramirez |
| 4,012,319 | A | 3/1977 | Ramirez |
| 4,193,949 | A | 3/1980 | Naito |
| 4,378,982 | A | 4/1983 | McCombs |
| 4,732,661 | A | 3/1988 | Wright |
| 4,765,807 | A | 8/1988 | Henriksen |
| 4,908,109 | A | 3/1990 | Wright |
| 5,049,252 | A | 9/1991 | Murrell |
| 5,182,014 | A | 1/1993 | Goodman |
| 5,534,143 | A | 7/1996 | Portier et al. |

(Continued)

FOREIGN PATENT DOCUMENTS

WO  WO 95/21795  8/1995

*Primary Examiner* — Christopher P Jones
(74) *Attorney, Agent, or Firm* — Guice Patents PLLC

(57) ABSTRACT

An oxygen generation device having a compressed air supply device, air cooling coil, a fan, pneumatic valve system, a housing, at least one media insert, an on-off switch, a printed circuit board, and a touch screen. The pneumatic valve system includes an air inlet port, a first air outlet port connected to the inlet of the first media insert, a second air outlet port connected to the inlet of the second media insert. The air inlet port receives compressed air from the compressed air supply device and alternatingly provides the compressed air to one of the first media insert and the second media insert. The lower housing includes check valve ball moveable between the first position and the second position and alternatingly controlling a flow of compressed air through the first media insert and the second media insert.

29 Claims, 12 Drawing Sheets

(56) References Cited

U.S. PATENT DOCUMENTS

| | | | |
|---|---|---|---|
| 6,315,886 B1 | 11/2001 | Zappi et al. | |
| 6,394,429 B2 | 5/2002 | Ganan-Calvo | |
| 6,471,873 B1 | 10/2002 | Greenberg et al. | |
| 6,764,534 B2 | 7/2004 | McCombs et al. | |
| 7,318,901 B2 | 1/2008 | Naess et al. | |
| 7,491,264 B2 | 2/2009 | Tao et al. | |
| 7,510,601 B2 | 3/2009 | Whitley et al. | |
| 7,976,617 B2 * | 7/2011 | Kao | B01D 53/0446 96/108 |
| 8,226,745 B2 | 7/2012 | Siew-Wah et al. | |
| 8,377,181 B2 | 2/2013 | Taylor et al. | |
| 8,603,228 B2 * | 12/2013 | Wilkinson | A61M 16/0677 96/115 |
| 9,321,001 B2 | 4/2016 | Whitcher et al. | |
| 9,440,180 B2 * | 9/2016 | Wilkinson | B01D 53/047 |
| 9,486,730 B2 * | 11/2016 | Bliss | B01D 53/0438 |
| 9,636,624 B2 * | 5/2017 | Kao | B01D 53/053 |
| 9,873,078 B2 * | 1/2018 | Koerber | C01B 13/0259 |
| 2007/0137487 A1 * | 6/2007 | Whitley | B01D 53/0415 96/121 |
| 2012/0167888 A1 * | 7/2012 | Taylor | A61M 16/101 128/205.12 |
| 2012/0266883 A1 * | 10/2012 | Taylor | C01B 13/0259 128/205.12 |
| 2015/0182720 A1 * | 7/2015 | Taylor | B01D 53/0438 128/205.12 |
| 2020/0061521 A1 * | 2/2020 | Hilbig | B01D 53/047 |
| 2020/0361770 A1 * | 11/2020 | Lee | B01D 53/047 |

\* cited by examiner

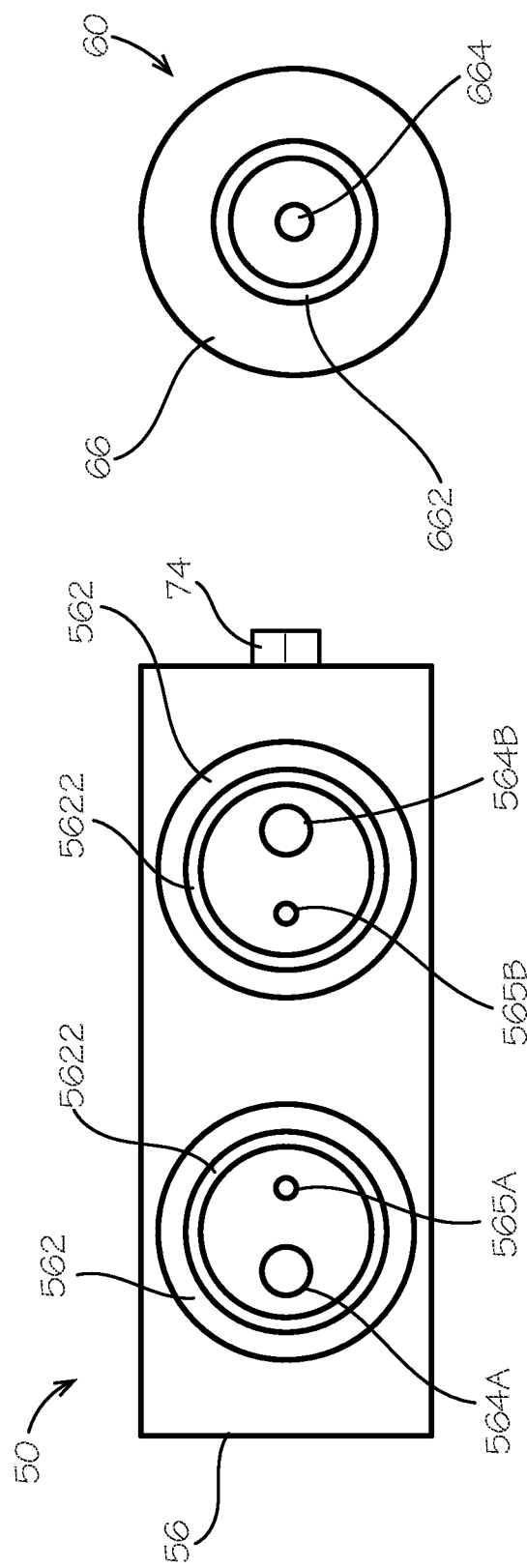

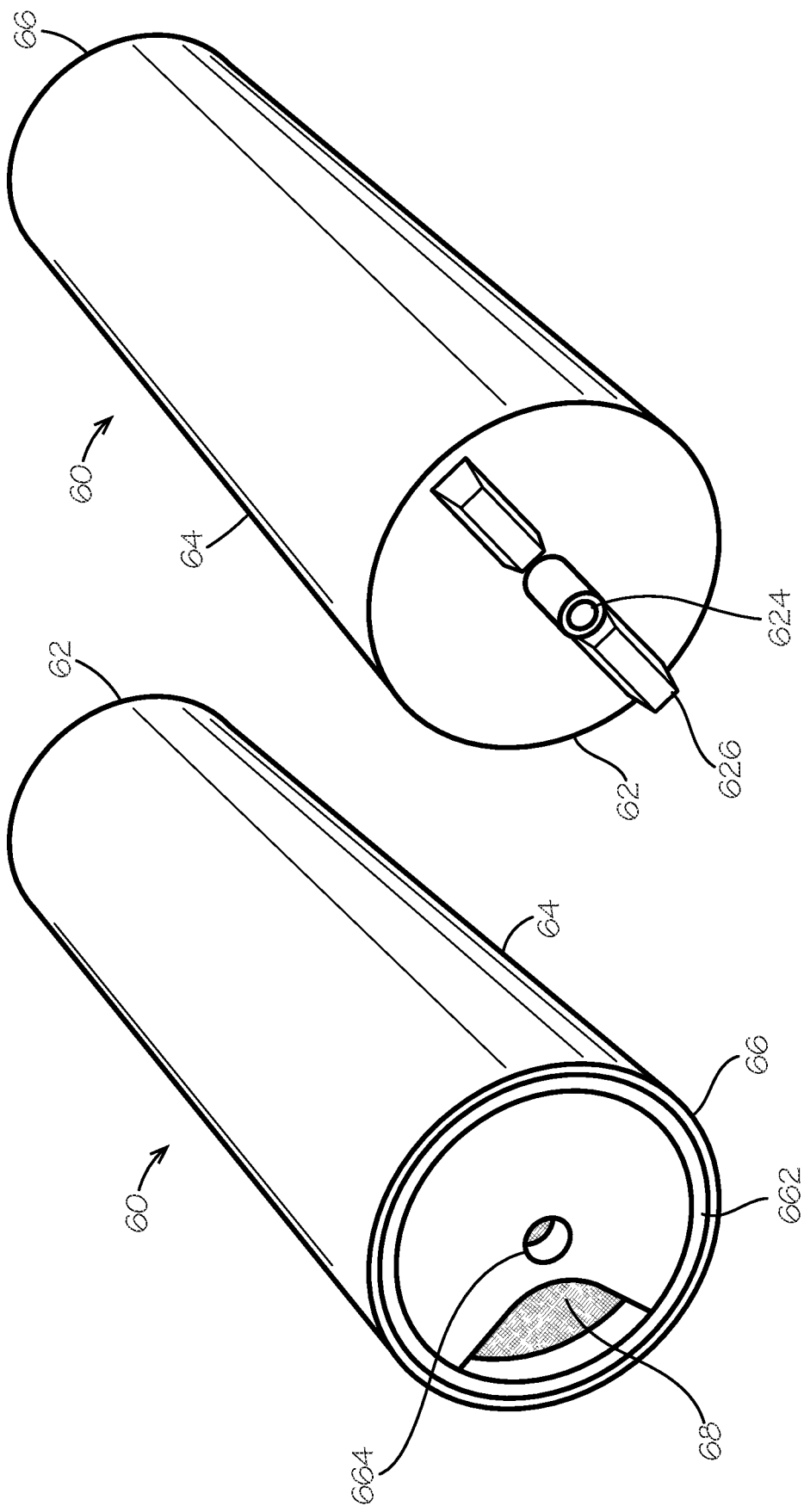

OXYGEN GENERATION DEVICE

BACKGROUND OF THE INVENTION

Field of the Invention

This invention relates to the generation and introduction of oxygen into an aqueous media for increasing the oxygen content of the aqueous media. The invention also includes on board devices and components to control an external pumping system to change out water in a reservoir when a fill water has a temperature that is lower than the water in the reservoir.

Description of the Related Art

Many benefits are obtained through raising the oxygen content of water found in portable or permanent reservoirs designed to hold aquatic or plant life. Efforts have been made to achieve higher saturation levels, or supersaturated oxygen levels for applications such as the improvement of water quality in ponds, lakes, marshes and reservoirs, the detoxification of contaminated water, culture of fish, shrimp, bass, crappie, and other aquatic animals, biological culture and hydroponic culture. Most fishing boats have a livewell or baitwell that are installed and intended to keep fish alive for consumption or for release at a time later than the time at which the fish were caught. There are numerous flaws in most if not all livewell systems installed in boats that are linked to the water in the tank or reservoir becoming warmer. Warmer water holds less oxygen, a detrimental condition for sustaining aquatic life. Tanks, livewells and reservoirs are exposed to a multitude of heat absorbing conditions such as solar gain, pump motor induction dissipation and from electrical heat dissipation from devices such as recirculating air pump motors. At present, the most commonly found systems for trying to keep fish alive include air pumping systems, turbulent recirculating systems with spray heads, electrolysis systems, and oxygen injected from tanks. It is a biological/scientific fact that the more weight of fish or oxygen using biological life put into a fixed capacity livewell the more demand there is on the oxygen levels in the water needed to sustain life. To the detriment of the aquatic life that has been placed in the livewell or reservoir, the warmer the water becomes due to solar gain and/or electrical induction heat gain from water flow friction or electrical conduction, the harder it is for the water to hold oxygen at any given temperature regardless of the mass of aquatic life placed in the livewell, tank, or reservoir. Most systems designed for livewells in fishing boats work adequately during cold weather due to the fact that cold water has the inherit ability to hold more oxygen. Warm water will increase the vapor pressure within oxygen bubbles and thus through elastomeric expansion increase the size of the oxygen bubbles leading to higher surface tension of the oxygen bubbles, making the space available for normal sized bubbles less available as water warms, and causing the bubbles to rise to the top of the water column too fast to benefit the fish or biological life in the aqueous medium. These same systems, per multiple scientific studies seeking to determine the rate of fish mortality at any given water temperature or oxygen content, have proven that fish and aquatic life that is exposed to an oxygen deficient environment can have an immediate high level of mortality as well as a high level of mortality for a delayed or post release time frame. The stress on bass, shrimp, and other fish, especially in warm weather, is extreme during warmer weather leading to confirmed high mortality rates even after the fish have been released. Many times, fish die days after being released because of oxygen deprivation and stress that was incurred while the fish were placed in fish tanks or livewells. Mortality of bass both during and in the days after release from tournaments and fishing events has proven that the most popular livewell aerating systems are inadequate to adequately sustain the fish with oxygen during the time of the tournament or fishing event. University studies have proven that stress on bass in particular, due to stress, oxygen deprivation, and turbidity inside a livewell, leads to delayed mortality at a much higher rate than what is commonly known or understood by the general public.

For example, fish held in a limited environment such as an aquarium, a bait bucket or a live hold tank quickly use up the dissolved oxygen in the course of normal respiration and are then subject to hypoxic stress, which can lead to death. A similar effect is seen in cell cultures, where the respiring cells would benefit from higher oxygen content of the medium. Contaminated or oxygen deprived water is described as having an increased biological oxygen demand (BOD) and water treatment or oxygenating is aimed at decreasing the BOD so as to make more oxygen available for fish and other life forms.

The most common method of increasing the oxygen content of a medium is by sparging with air or oxygen. While this is a simple method, the resulting large bubbles produced by simple air introduction under pressure rapidly rise to the surface and are discharged or dissipated into the atmosphere. Attempts have been made to reduce the size of the bubbles in order to facilitate oxygen transfer by decreasing the total surface area of the oxygen bubbles. U.S. Pat. No. 5,534,143 discloses a microbubble generator that achieves a bubble size of about 0.10 millimeters to about 3 millimeters in diameter. U.S. Pat. No. 6,394,429 discloses a device for producing microbubbles, ranging in size from 0.1 to 100 microns in diameter, by forcing air into the fluid at high pressure through a small orifice.

When the object of generating bubbles is to oxygenate the water, air with an oxygen content of about 21% may be used, but under many conditions an oxygen level as low as 21% used in bubble generation is found to be inadequate to sustain life. The production of oxygen with a byproduct of hydrogen for use in livewells and waste water treatment by the electrolysis of water is well known. However, the rate of oxygen production required to keep fish or aquatic life vibrant and healthy is based on a matrix formula. The matrix would have multiple factors influencing the outcome such as the volume of animal life in the tank compared to the volume of water inside the livewell or tank as well as the temperature of the water in a livewell which determines the rate at which the oxygen found in the water has been used up by the aquatic life and must be replaced by oxygen introduction. The oxygen introduced into the water must then be of a bubble size that allows respiratory absorption by the fish or animal. The addition of oxygen in a livewell or tank that holds or stores aquatic life is imperative anytime the oxygen saturation levels fall below a threshold of 4 ppm, the readily accepted minimum for fish survival. An undesirable effect of an electrolysis system, one of the more popular livewell or baitwell oxygen generating systems commonly found in boats and tanks where aquatic life needs to have the oxygen levels augmented artificially, is that hydrogen gas is produced at the cathode along with the targeted oxygen gas that the electrolysis process was intended to produce. The hydrogen gas levels generated by the electrolysis process can easily pose a potentially dangerous and gaseous condition when ample volumes are present.

Holding vessels for live animals tend to have a high population of animals which use up the available oxygen rapidly. Pumps to supply oxygen have high power requirements and the noise and bubbling may further stress the animals. The available electrolytic generators which are capable of producing adequate oxygen levels, likewise have high power requirements and additionally run at high voltages and produce acidic and hydrogen rich water which is detrimental to the very animals the system is supposed to help or sustain. Many of the animals, fish, or other aquatic life that require oxygenating systems, systems designed to keep bait or caught fish alive, would benefit from portable devices that did not require a source of high power and undesirable off-gasses. The need remains for a relatively quiet, portable or permanent, and a low voltage system to oxygenate water as well as an automatic control system that can facilitate changing out the water in a livewell whenever optimum conditions exist in order to improve the life and viability of fish by using the water in the tank or reservoir or by changing the water in the tank or reservoir out to a cooler fill water source in order to maximize the oxygen holding ability of the water in the tank or reservoir.

SUMMARY OF THE INVENTION

One primary objective of the present invention is to provide an oxygen generator and livewell controller which is a combination of a housing fixture or box, an oilless air compressor, a supply air super-cooler coil, a fan to provide cooling air across the air compressor and the supply air super-cooler, a machined or injection molded header containing a system or series of integral check valves, an electrically controlled airflow port selection valve, inherent slide-valve regeneration porting, a chemical scrubber media in at least two separate beds, and an automatic fill pump control system or program.

A further objective of the present invention is to provide an oxygen generation and or livewell control system that provides nearly pure oxygen in volumes and pressures necessary to super-oxygenate the water, but with the additional benefit of the oxygen being comprised of very small microbubbles and nanobubbles of oxygen as it is introduced in an aqueous medium. The bubbles and oxygen stream delivered into the aqueous medium are small enough not to quickly break the surface tension of the water in the tank or reservoir resulting in an aqueous medium that is supersaturated with oxygen.

Another objective of the present invention is to provide an oxygen generator and livewell controller that can be sized for virtually any size application based on oxygen need of the aqueous medium, as well as being contingent upon the need to super-saturate any given volume of water in a set time period regardless of the amount of fish or aquatic life in the livewell.

A further objective of the present invention is to provide an oxygen generator and livewell controller that can also be assembled without the housing or box in case space permits the components to be built in or added to an existing vessel or facility where the housing or box is not wanted or is not necessary for protecting the interior components of the system.

Another objective of the present invention is to provide an oxygen generator and livewell controller wherein the media holding canisters have been designed to maximize a flow of air through the media bed via porting in the media canister. Media canisters containing chemicals that readily absorb nitrogen under pressure are part of this invention. The media canisters will need to be replaced when the chemical media contained within the canisters becomes contaminated or ineffective due to fouling of the absorbent pores of the media from foreign matter contained within the supply air stream. This invention also been designed to allow replacement of the media holding canisters by inserting the media holding canisters into the housing via threads located on the entering air end of the canisters. The air exit end of the canister is sealed against the header by an O-ring.

A further objective of the present invention is to provide an oxygen generator and livewell controller that includes a controlling device or a controlling circuit to energize an external pumping system to change out water in a reservoir when a fill water, water available for filling the reservoir, has a temperature that is lower than the water in the reservoir. Water with a lower temperature is able to hold a higher concentration of oxygen than water with a warmer temperature.

DESCRIPTION OF THE DRAWINGS

FIG. 8 is an end view of a lower housing of a housing of the present invention.

FIG. 9 is an end view of a media insert of the present invention.

FIG. 10 is a perspective end view of a media insert of the present invention.

FIG. 11 is a perspective end view of a media insert of the present invention.

DETAILED DESCRIPTION OF THE PREFERRED EMBODIMENT

Figure 1:
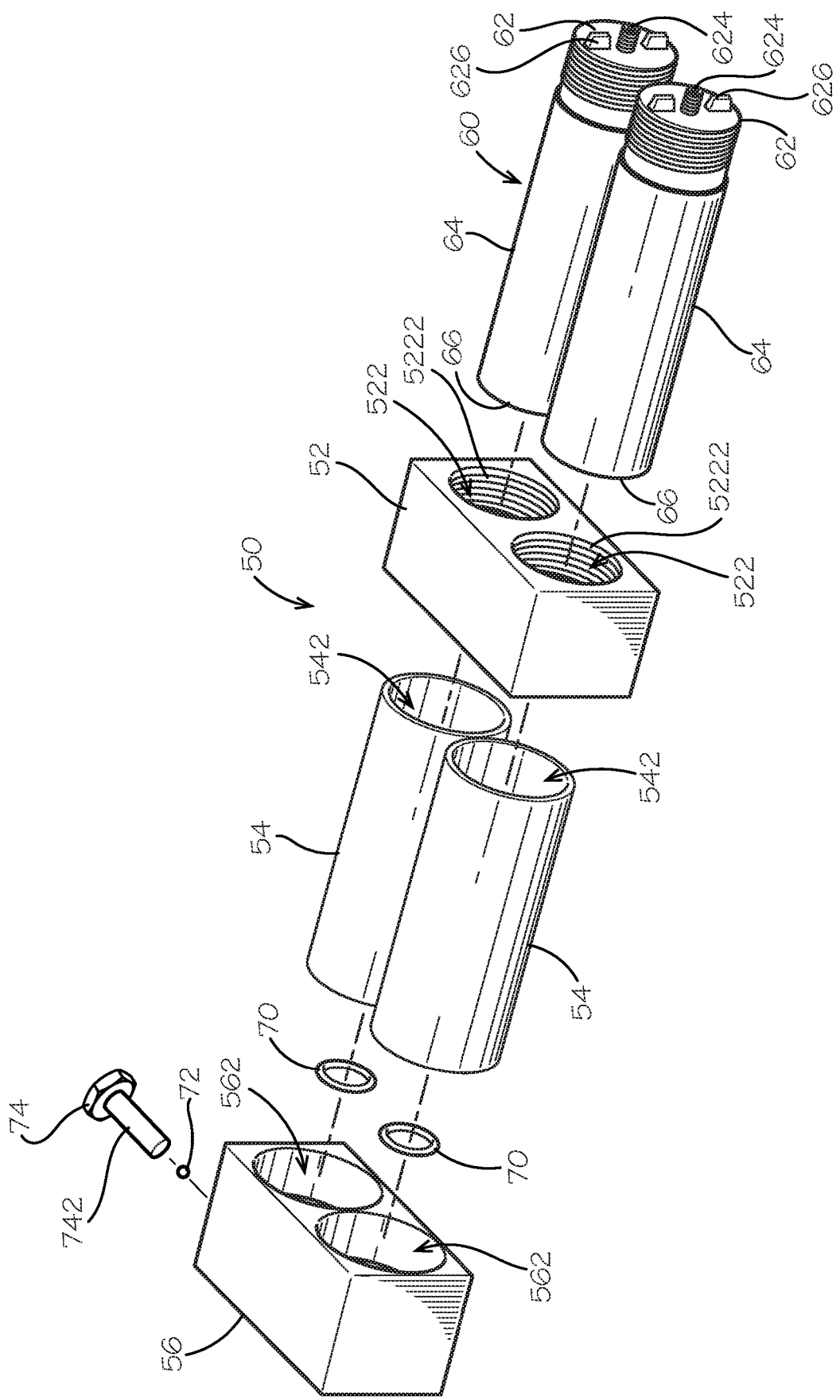
FIG. 1 is an exploded view of the present invention.
Figure 2:
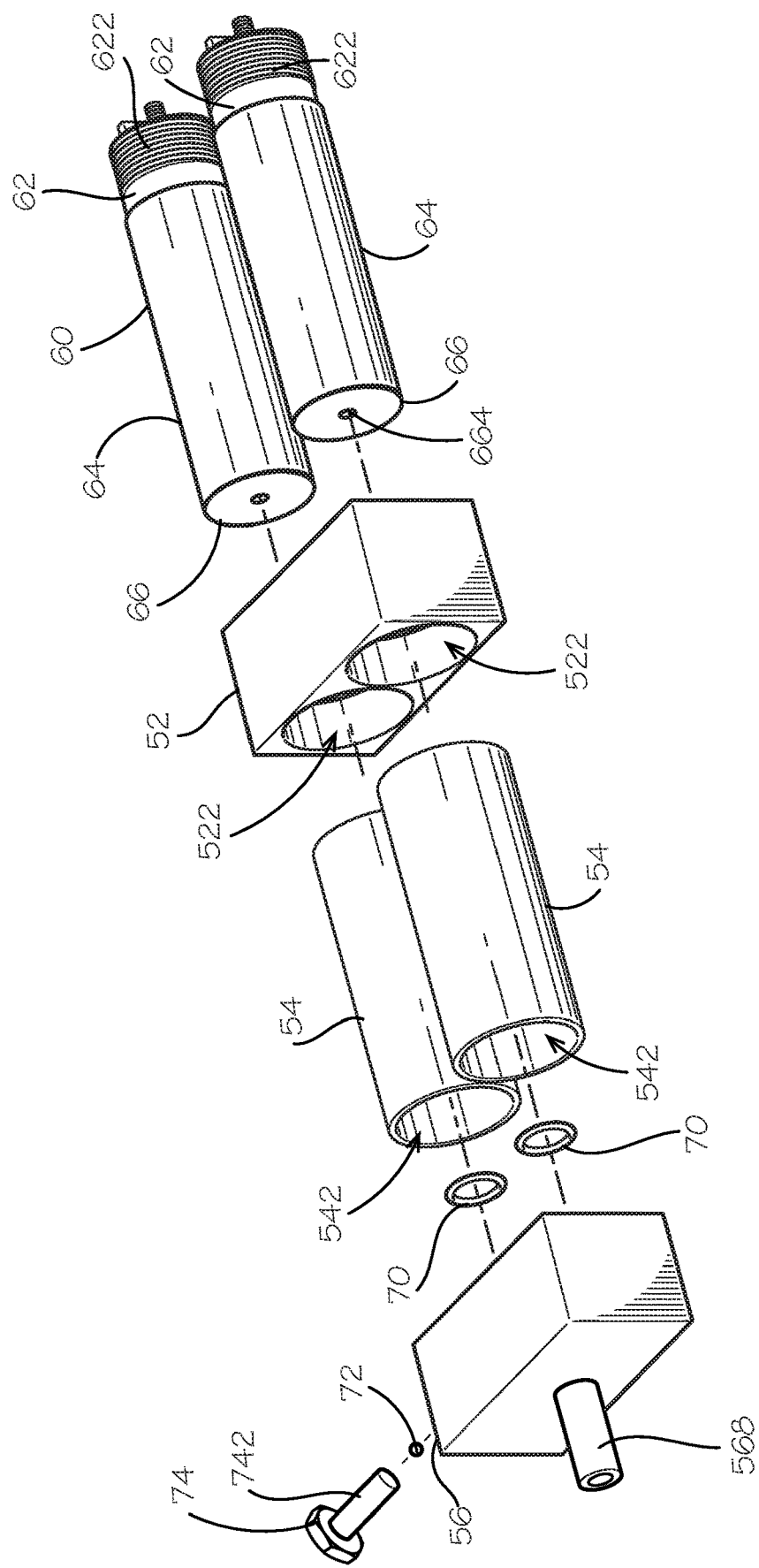
FIG. 2 is an exploded view of the present invention.

FIGS. 1-13 illustrate an oxygen generation device 1 that generations and introduces oxygen into an aqueous media for increasing the oxygen content of the aqueous media. The oxygen generation device 1 includes a compressed air supply device, an air cooling coil 20, a fan 30, a pneumatic valve system 40, a housing 50, at least one media insert 60, an on-off switch 80, a first temperature sensor 145, a second temperature sensor 146, a third temperature sensor 147, a fill pump 114, and a printed circuit board 90.

The oxygen generation device 1 can be powered by either an alternating current (AC) and/or a direct current (DC) and can include a power convertor to convert an electric energy from AC or DC into DC or AC, whichever is suitable for a specific application. The oxygen generation device 1 includes a power plug 48 to electrically connect the alternating current and/or a direct current power supply to the compressed air supply device, the fan 30, the pneumatic valve system 40, and an electronic control board 90. The oxygen generation device 1 can be a low voltage system or a high voltage system to accommodate the requirements of an application.

The oxygen generation device 1 can be an integrally installed component in an application or installed in a portable container 140 for easy movement and quick installation between applications.

The compressed air supply device provides a compressed air at a pressure of 15-25 psi. An optimal pressure of the compressed air provided by the compressed air supply device can be 20 psi. The compressed air supply device can be any compressed air device that provides a compressed air, including an air tank, an air compressor 10 (e.g. a piston or diaphragm air compressor), an air compressor with an air tank, or an air supply system. In a commercial application, the compressed air supply device can be a built-in air supply system that provides a regulated air flow and is controlled by an air supply valve or solenoid valve. For purposes of discussion and illustration, the compressed air supply device is shown as an air compressor 10 in the figures.

The air compressor 10 is an oilless (oil-free) air compressor capable of providing a compressed air at a pressure of 15-25 psi. An optimal pressure of the compressed air provided by the air compressor 10 can be 20 psi.

The air cooling coil 20 is connected between the air compressor 10 and the at least one media insert 60. The fan 30 can be electrically connected to the printed circuit board 90 and positioned adjacent to the air cooling coil 20 to move air across the air cooling coil 20 and remove undesirable heat that was added to the compressed air by the air compressor.

The pneumatic valve system 40 includes an air inlet port 42, a first air outlet port 44, a second air outlet port 46, and a power plug 48. The first air outlet port 44 is connected to an inlet 624 of the first media insert 60 by a first intermediate air hose 120. The second air outlet port 46 is connected to the inlet 624 of the second media insert 60 by a second intermediate air hose 120. The air inlet port 42 receives the compressed air from the air compressor 10 through an air supply hose 110 and alternatingly provides the compressed air to one of the first air outlet port 44 and the second air outlet port 46. The pneumatic valve system 40 alternatingly provides the compressed air to one of the first media insert 60A and the second media insert 60B.

The air inlet port 42 receiving the compressed air from the air compressor 10 and alternatingly provides the compressed air to one of the first air outlet port 44 and the second air outlet port 46. The air outlet port, either the first air outlet port 44 or the second air outlet port 46, that does not receive the compressed air via the internal porting of the pneumatic valve system 40 is vented to the atmosphere.

The pneumatic valve system 40 alternatingly provides the compressed air to the first media insert 60A for a predetermined oscillation rate and alternatingly provides the compressed air to the second media insert 60B for a predetermined oscillation rate. The predetermined oscillation rate can be any suitable time. More specifically, the oscillation rate can be in a range from 5-60 seconds. In some applications, the oscillation rate of 5-10 seconds, or 5 seconds can be optimal.

The housing 50 has at least one insert chamber 501 and an air outlet port 568. The at least one insert chamber 501 has at least one first end opening 522.

The at least one media insert 60 contains a nitrogen absorbing media 644 located in a media housing 64 and has the inlet 624 located on a connector end 62 and an outlet 664 located on an exit end 64. The connector end 62 and the exit end 66 are located at opposing ends of the media housing 64. The at least one media insert 60 has a screen 68 located at each end to prevent the nitrogen absorbing media 644 from being released through the inlet 624 and the outlet 664. The at least one media insert 60 and the screen 68 can be made of any metal, plastic, polymer, or a combination thereof. FIG. 10 has a section cutout of the exit end 66 to illustrate a configuration of the screen 68. The screen 68 can have a size ranging from covering the inlet 624 and the outlet 664 to covering an interior of the connector end 62 and an interior of the exit end 66 of the media insert 60. The screen can have a diameter as small as a diameter of the inlet 624 and/or a diameter of the outlet 664, as large as a diameter of the interior of the connector end 62 and/or a diameter of an interior of the exit end 66 of the media insert 60, or any size in between. The screen 68 can be located against or spaced apart from the interior of the connector end 62 and the interior of the exit end 66 of the media insert 60. The nitrogen absorbing media 644 is a nitrogen absorbing material selected from a group comprising any nitrogen absorbing material including natural zeolites, synthetic zeolites, analcime, chabazite, clinoptilolite, heulandite, natrolite, phillipsite, stilbite, or a combination thereof. The zeolites may include other minerals, metals, quartz, or other zeolites. The at least one media insert 60 is removably inserted into the at least one insert chamber 501 of the housing 50. The at least one media insert 60 can be removably secured in the at least one insert chamber 501 of the housing 50 by a collar, latches, tabs, threads or a combination thereof. The outlet 664 of the at least one media insert 60 communicates with the air outlet port 568 of the housing 50, and the inlet 624 of the at least one media insert 60 selectively receives a compressed air from the air compressor 10. The inlet 624 of the at least one media insert 60 can be a protrusion, threaded protrusion, internally threaded opening, or other suitable device for connecting to an intermediate air hose 120. The compressed air flows through the nitrogen absorbing media 644 located in an interior of the at least one media insert 60, and the compressed air exits the outlet 664 of the at least one media insert 60 as an oxygen enriched air and is released through the air outlet port 568 of the housing 50. The air outlet port 568 can be connected to a first end of a air delivery hose 130 and a diffuser 135 (commercial component not shown) can be connected to a second end of the air delivery hose 130.

The at least one first end opening 522 of the at least one insert chamber 501 of the housing 50 can have internal threads 5222 and the at least one media insert 60 can have external threads 622. The inlet 624 and external threads 622 of the at least one media insert 60 can be located on a first end thereof and the outlet 664 of the at least one media insert 60 can be located on a second end thereof. The at least one media insert 60 being threadedly connected to the at least one insert chamber 501. The at least one media insert 60 can have a pair of tabs 626 located on the first end thereof.

The air flow through the nitrogen absorbing media 644 is adjustable between a nitrogen absorbing air pressure and a nitrogen releasing air pressure. The nitrogen absorbing air pressure is an air pressure that is greater than an air pressure of the nitrogen releasing air pressure. The nitrogen absorbing air pressure is when the air pressure provided by the air compressor 10 to the at least one media insert 60 is in the range of 15-25 psi. An optimal air pressure is 20 psi. The nitrogen releasing air pressure is when the air pressure in the at least one media insert 60 is vented to the atmosphere or at an atmospheric pressure. When the nitrogen absorbing media 644 is subjected to the nitrogen absorbing air pressure, the nitrogen absorbing media 644 absorbs nitrogen from the compressed air, which increases an oxygen level in the compressed air. The remaining gas that has not been absorbed in the nitrogen absorbing cycle is predominately oxygen. When the nitrogen absorbing media 644 is subjected to the nitrogen releasing air pressure, the nitrogen absorbing media 644 releases nitrogen into the air and the air with a high nitrogen content is vented out of the at least one media insert 60 via a reverse air flow.

The housing 50 has an upper housing 52, at least one housing body 54, a lower housing 56, and the at least one insert chamber 501. The at least one housing body 54 is located between and connected to the upper housing 52 and the lower housing 56. The at least one insert chamber 501 has the at least one first end opening 522 located in the upper housing 52, a hollow interior 542 located in the at least one housing body 54, and at least one second end opening 562 located in the lower housing 56.

Figure 3A:
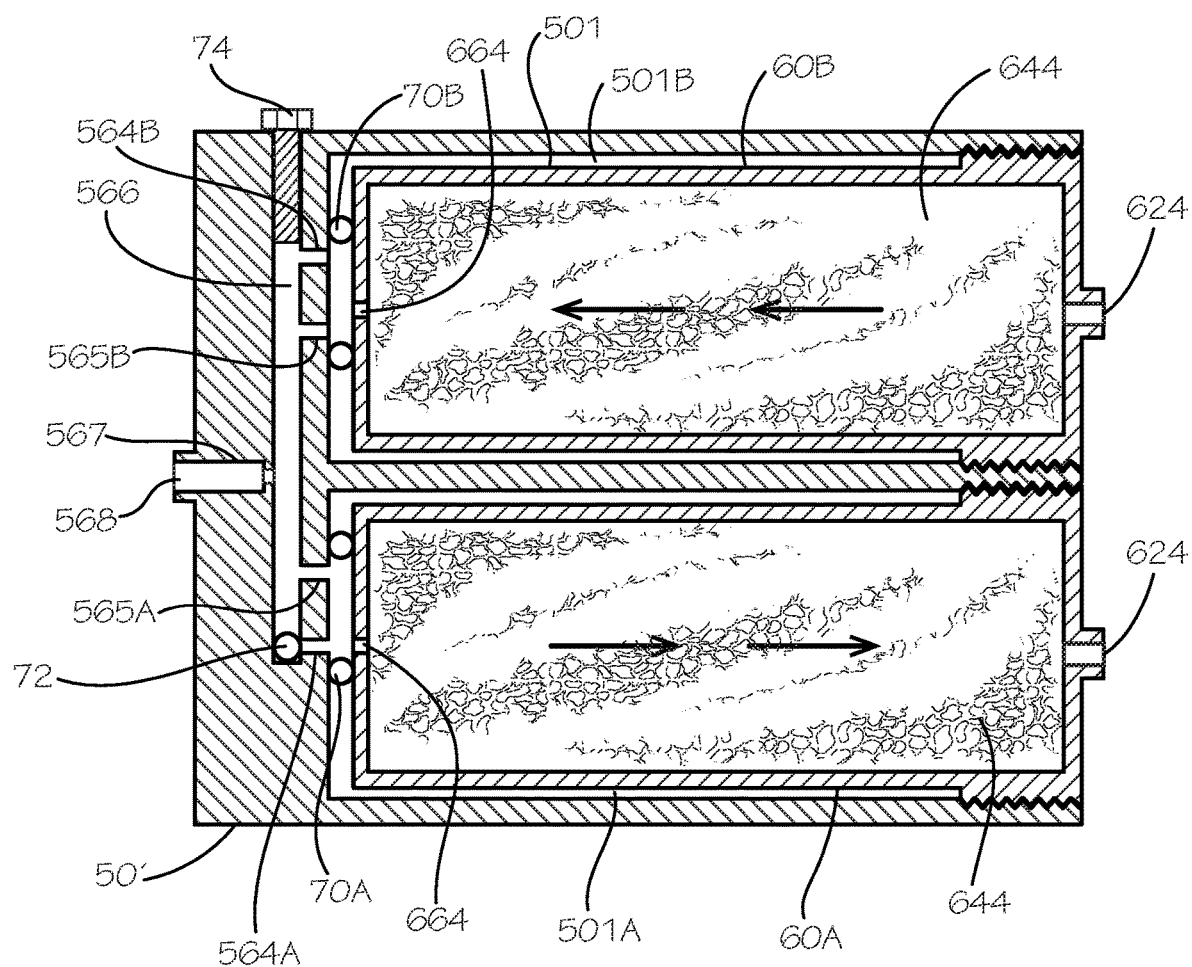
FIG. 3A is section view of the present invention with the check valve ball located in the first position.
Figure 3B:
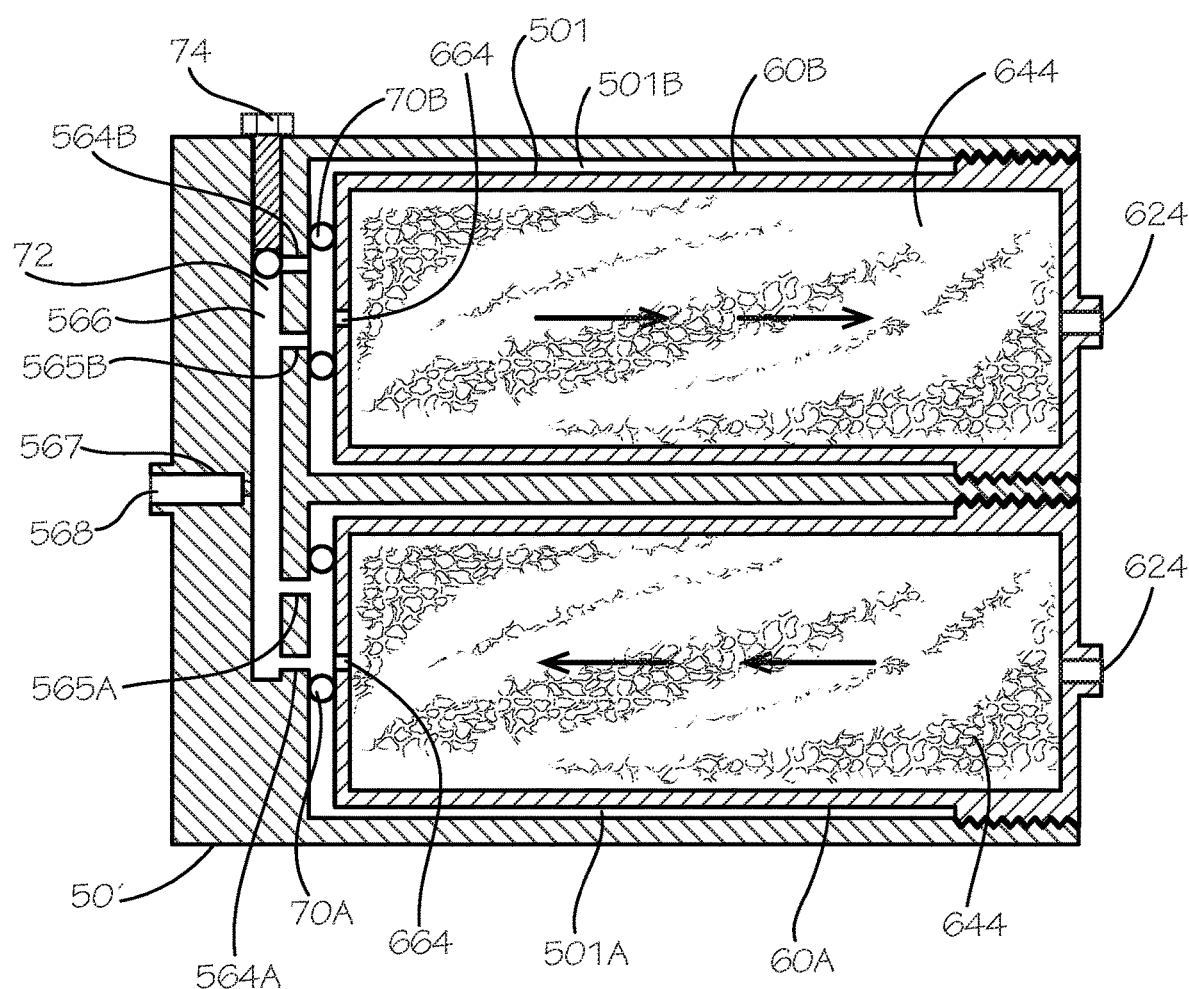
FIG. 3B is section view of the present invention with the check valve ball located in the second position.
Figure 4:
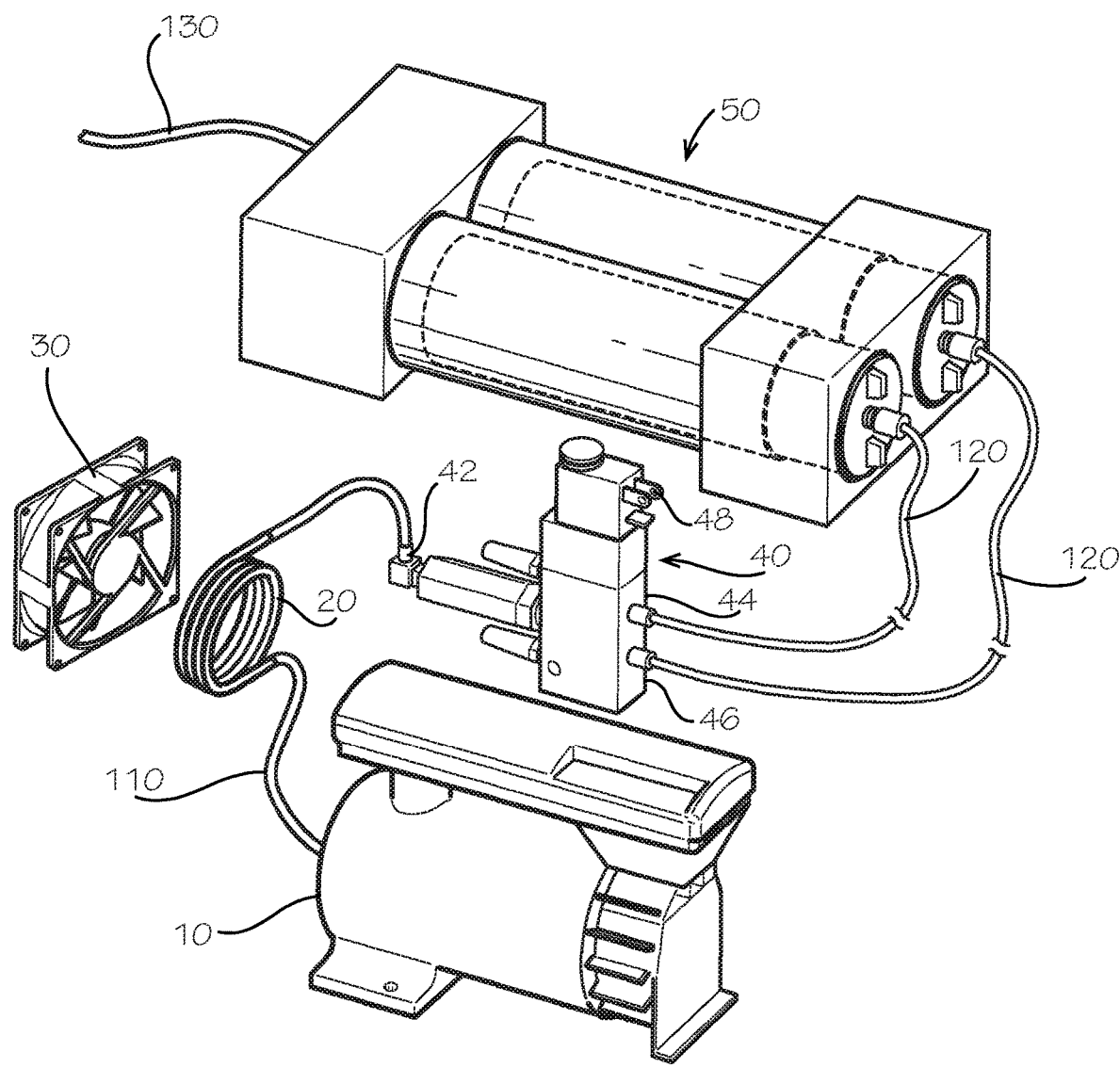
FIG. 4 is a side view of the present invention.

The upper housing 52, the at least one housing body 54, and the lower housing 56 can be made of any metal, plastic, polymer, or a combination thereof. The upper housing 52, the at least one housing body 54, and the lower housing 56 can be welded, soldered, glued, joined mechanically with threads or latches, or using any connecting device. As shown in FIGS. 3A and 3B, the upper housing 52, the at least one housing body 54, the lower housing 56, and the at least one insert chamber 501 of the housing 50' can be integrally formed as a single piece. The housing 50', the upper housing 52, the at least one housing body 54, the lower housing 56, and the at least one insert chamber 501 can have an outer shape and a cross section with a shape corresponding to requirements for a specific application. The outer shape and the cross section of the housing 50', the upper housing 52, the at least one housing body 54, the lower housing 56, and the at least one insert chamber 501 can be a shape of a circle, a cone, an oval, a rectangle, a square, a polygon, a combination thereof, or any suitable shape. The at least one media insert 60 has a shape corresponding to the at least one insert chamber 501.

The at least one insert chamber 501 includes a first insert chamber 501A and a second insert chamber 501B. The at least one housing body 54 includes a first housing body 54 and a second housing body 54. The at least one first end opening 522 of the upper housing 52 includes two first end openings 522. The at least one second end opening 562 of the lower housing 56 includes two second end openings 562. The first insert chamber 501A is defined by a first corresponding one of the two first end openings 522 of the upper housing 52, a hollow interior 542 of the first housing body 54, and a first corresponding one of the two second end openings 562 of the lower housing 56. The second insert chamber 501B is defined by a second corresponding one of the two first end openings 522 of the upper housing 52, a hollow interior 542 of the second housing body 54, and a second corresponding one of the two second end openings 562 of the lower housing 56.

The at least one media insert 60 includes a first media insert 60A and a second media insert 60B. The first media insert 60A is located in the first insert chamber 501A, and the second media insert 60B is located in the second insert chamber 501B.

For large applications, the at least one insert chamber 501 can include multiple sets of the first insert chamber 501A and the second insert chamber 501B and the at least one media insert 60 can include multiple sets of the first media insert 60A and the second media insert 60B. The at least one insert chamber 501 and the at least one media insert 60 can be sized to provide air with a high oxygen level for a specific application.

The lower housing 56 includes the two second end openings 562, a first forward flow channel 564A, a second forward flow channel 564B, a first reverse flow channel 565A, a second reverse flow channel 565B, an inner channel 566, an air outlet channel 567, the air outlet port 568, a check valve ball 72, and a tap 74. The first forward flow channel 564A and the second forward flow channel 564B each have a diameter that can be larger than a diameter of the first reverse flow channel 565A and the second reverse flow channel 565B.

The first forward flow channel 564A and the first reverse flow channel 565A are located between and communicating with the first insert chamber 501A and the inner channel 566. The air outlet channel 567 is located in the lower housing 56 and connected between the inner channel 566 and the air outlet port 568. The air outlet port 568 can extend outwardly from the lower housing 56 of the housing 50 or the air outlet port 568 can be an internal connector located within the lower housing 56 of the housing 50. The first forward flow channel 564A and the first reverse flow channel 565A communicating with the air outlet channel 567 through the inner channel 566. The air outlet port 568 is connected to the air outlet channel 567 by welding, soldering, gluing, joining mechanically with threads or formed integrally with the housing 50.

The second forward flow channel 564B and the second reverse flow channel 565B are located between and communicating with the second insert chamber 501B and the inner channel 566. The second forward flow channel 564B and the second reverse flow channel 565B communicating with the air outlet port 568 through the inner channel 566.

The check valve ball 72 is located in the inner channel 566 and moveable between the first position and a second position. The check valve ball 72 is moved between the first position and the second position by the compressed air flowing through either the first media insert 60A in the first insert chamber 501A or the second media insert 60B located in the second insert chamber 501B. The check valve ball 72 can be a round ball or a slide body of any shape that corresponds to a cross section of the inner channel 566.

The tap 74 can be used to seal an end of the inner channel 566 after the check valve ball 72 is inserted into the inner channel 566 and to limit position of the check valve ball 72, when the check valve ball 72 is located in the second position. The tap 74 has a shaft 742. The shaft 742 limits a movement of the check valve ball 72, when the check valve ball 72 is located in the second position. The tap 74 can be secured in the inner channel 566 by welding, soldering, gluing, joined mechanically with threads or latches, or using any connecting device. The shaft 742 can have external threads and the inner channel 566 can have internal threads to connect the tap 74 to the lower housing 56 of the housing 50.

When the check valve ball 72 is located in the first position, as shown in FIG. 3A, the compressed air flows in a forward direction through the second media insert 60B and in a reverse direction through the first media insert 60A via the reverse flow channel 565A. The compressed air flows in the forward direction through the second forward flow channel 564B and the second reverse flow channel 565B and moves the check valve ball 72 into the first position. When the check valve ball 72 is located in the first position, the check valve ball 72 blocks the flow of the compressed air through the first forward flow channel 564A and the compressed air flows primarily out of the housing 50 through the air outlet port 568 and a small amount of compressed air flows in a reverse direction through the first reverse flow channel 565A and the first media insert 60A. When the check valve ball 72 is located in the first position, the check valve ball 72 can align with the first forward flow channel 564A. The forward direction is defined as a flow of air from the inlet 624 toward the outlet 664 of the at least one media insert 60. The reverse direction is defined as a flow of air from the outlet 664 toward the inlet 624 of the at least one media insert 60.

When the check valve ball 72 is located in the second position, as shown in FIG. 3B, the compressed air flows in a forward direction through the first media insert 60A and in a reverse direction through the second media insert 60B, the compressed air flowing in the forward direction through the first forward flow channel 564A and the first reverse flow channel 565A moves the check valve ball 72 into the second position. When the check valve ball 72 is located in the second position, the check valve ball 72 blocks the flow of the compressed air through the second forward flow channel 564B and the compressed air flows primarily out of the housing 50 through the air outlet port 568 and a small amount of compressed air flows in a reverse direction through the second reverse flow channel 565B and the second media insert 60B. When the check valve ball 72 is located in the second position, the check valve ball 72 can align with the second forward flow channel 564B.

At least one O-ring 70 can be used to create a seal between the at least one media insert 60 (the first media insert 60A and the second media insert 60B) and the at least one insert chamber 501 (the first insert chamber 501A and the second insert chamber 501B). A protrusion or a groove can be used to position the O-ring 70. The protrusion or the groove can be formed in either the at least one insert chamber 501 (two second end openings 562) or the exit end 66 of the at least one media insert 60, or both. The at least one O-ring 70 can be an O-ring or a flat washer.

The at least one O-ring 70 can include a first O-ring 70 and a second O-ring 70. The first O-ring sealing the first media insert 60A with the first insert chamber 501A (at least one second end opening 562 of the lower housing 56). The first forward flow channel 564A and the first reverse flow channel 565A are positioned within an interior of the first O-ring and communicate with the outlet 664 of the first media insert 60 through the first O-ring. The second O-ring sealing the second media insert 60B with the second insert chamber 501B (at least one second end opening 562 of the lower housing 56). The second forward flow channel 564B and the second reverse flow channel 565B are positioned within an interior of the second O-ring and communicate with the outlet 664 of the second media insert 60 through the second O-ring.

FIG. 8 shows the lower housing 56 of the housing 50 having two grooves 5622. One O-ring 70 can be inserted into each of the two grooves 5622. One groove 5622 is located in the at least one insert chamber 501 of the lower housing 56 of the housing 50. The first forward flow channel 564A and the first reverse flow channel 565A of the housing 50 are positioned within a first of the two grooves 5622. The second forward flow channel 564B and the second reverse flow channel 565B of the housing 50 are positioned within a second of the two grooves 5622. Each groove 5622 can be replaced with a protrusion to position the O-ring.

FIGS. 9 and 10 show a groove 662 located in the exit end 66 of the at least one media insert 60. The O-ring 70 can be inserted into the groove 662. The outlet 664 of the at least one media insert 60 is positioned within the groove 662. The groove 662 can be replaced with a protrusion to position the O-ring.

Figure 7:
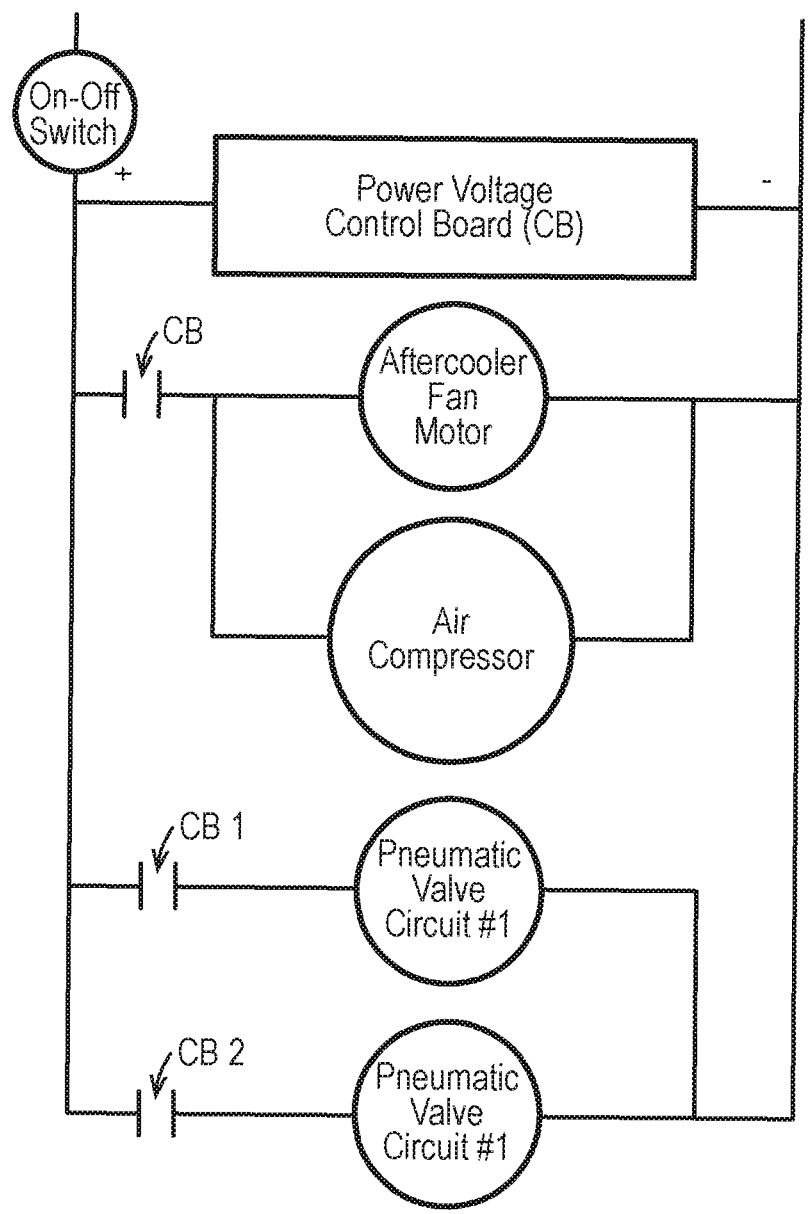
FIG. 7 is an electric schematic of the present invention.

The printed circuit board 90 (electronic control board) is electrically connected to and controls the air compressor 10, the pneumatic valve system 40, the fan 30, the first temperature sensor 145, the second temperature sensor 146, the third temperature sensor 147, and the fill pump 114. See FIG. 13. The printed circuit board 90 is electrically connected to a power supply via a power plug 48. As shown in FIG. 7, the printed circuit board 90 controls a pneumatic valve circuit of the first air outlet port 44 and the second air outlet port 46 of the pneumatic valve system 40 to regulate an oscillation rate for compressed air to alternatingly provide compressed air to one of the first air outlet port 44 and the second air outlet port 46. The pneumatic valve circuit includes a pneumatic valve circuit #1 for the first air outlet port 44 and a pneumatic valve circuit #2 for the second air outlet port 46. The on-off switch 80 is electrically connected to the circuit board 90 to selectively engage and disengage a power supply provided to the circuit board. The oxygen generation device 1 can be powered by either an alternating current (AC) and/or a direct current (DC) and can include a power convertor to convert an electric energy from AC or DC into DC or AC, whichever is suitable for a specific application. The Control Board (CB) will be selected and sized to correspond with the AC power supply or DC power supply being used for a specific application.

Figure 5:
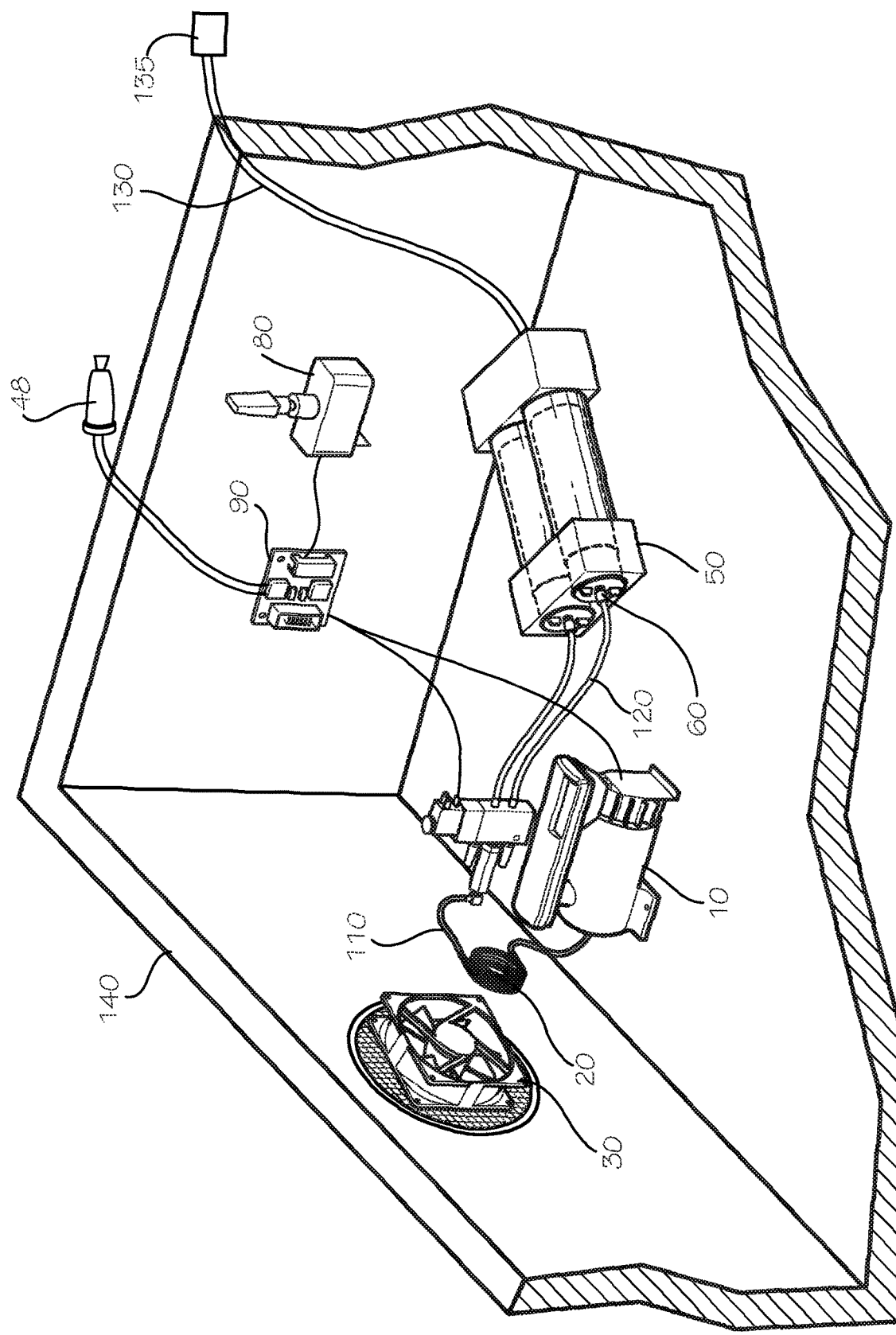
FIG. 5 is a side view of the present invention installed in a single housing.

As shown in FIG. 5, the components of the oxygen generation device 1 can be integrally installed in a single housing or a portable container 140. When the oxygen generation device 1 is a portable device, the air compressor 10, the housing 50, the at least one media insert 60, the pneumatic valve system 40, the on-off switch 80, and the printed circuit board 90 are located in a portable container 140.

Figure 6:
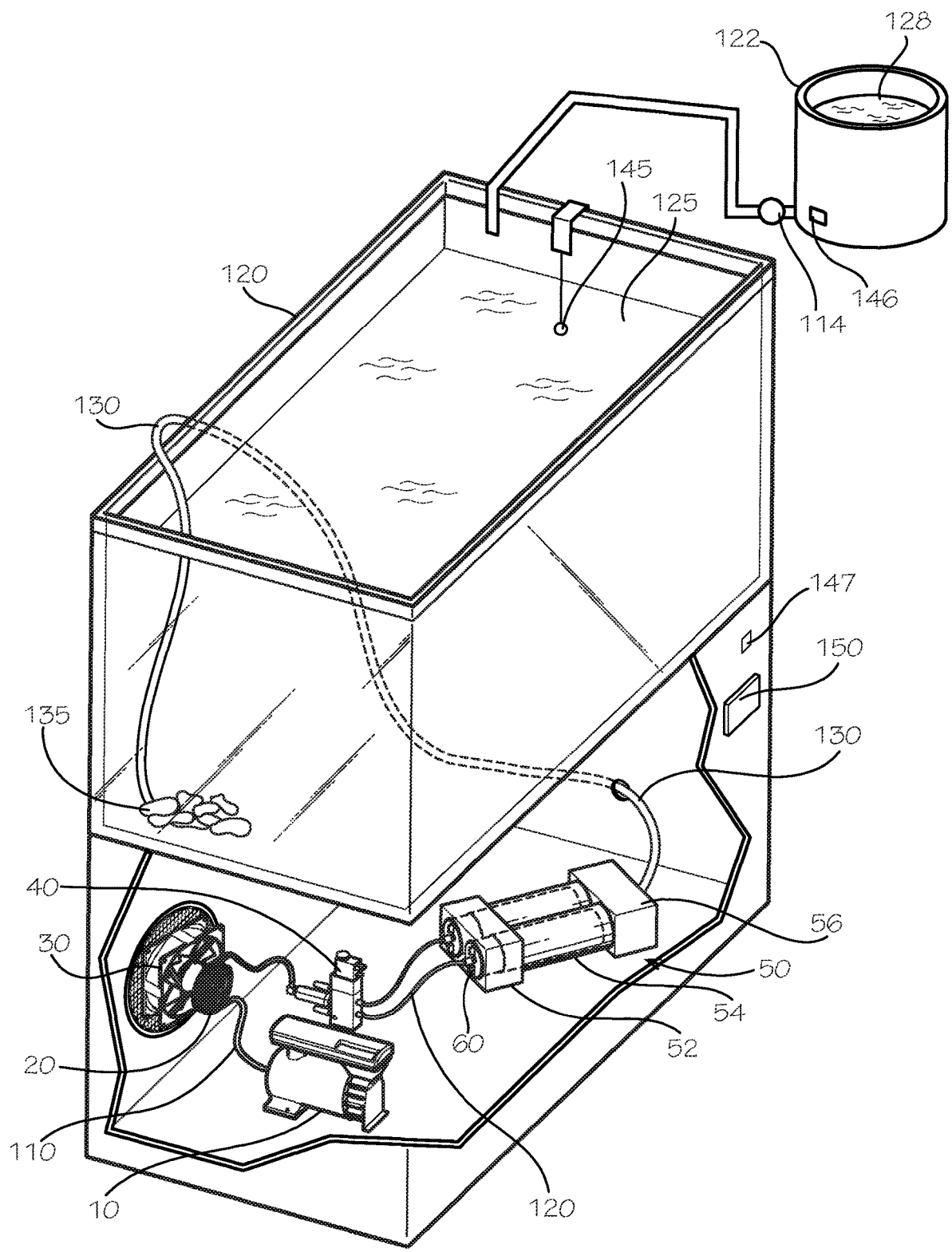
FIG. 6. is a side view of the present invention installed in a tank system.

FIG. 6 shows the components of the oxygen generation device 1 in use with a storage tank 120. The components of the oxygen generation device 1 can be located in an inconspicuous location or various locations of a tank assembly, boat, or storage device as would be convenient for a specific application.

As shown in FIG. 6, the first temperature sensor 145 measures a temperature of water 125 located in a storage tank 120, the second temperature sensor 146 measures a temperature of a fill water 128 located in a fill tank 122, and the third temperature sensor 147 measures an ambient air temperature. The storage tank 120 can be a livewell, baitwell, or tank holding aquatic life. The fill water 128 located in a fill tank 122 can be water from a water storage tank, a pond, a river, or any suitable water source. When the temperature of the water 125 in the storage tank 120 is higher than the temperature of the fill water 128, the printed circuit board 90 controls the fill pump 114 to add the cooler, more desirable fill water 128 to the storage tank 120. Typically, the storage tank 120 (i.e., livewell, baitwell, or tank holding aquatic life) has an overflow opening or channel to remove excess water from and to control a water level in the storage tank 120. A power supply is connected to the air compressor 10, the fan 30, the pneumatic valve system 40, the first temperature sensor 145, the second temperature sensor 146, the fill pump 114, and an electronic control board 90.

The oxygen generation device 1 can include a touch screen 150 connected to the circuit board 90. The circuit board 90 will use data input into the touch screen 150 to control the oxygen generation device 1. The touch screen can include or be replaced by mechanical buttons and switches to accomplish some or all of the functions of the touch screen 150.

Figure 12:
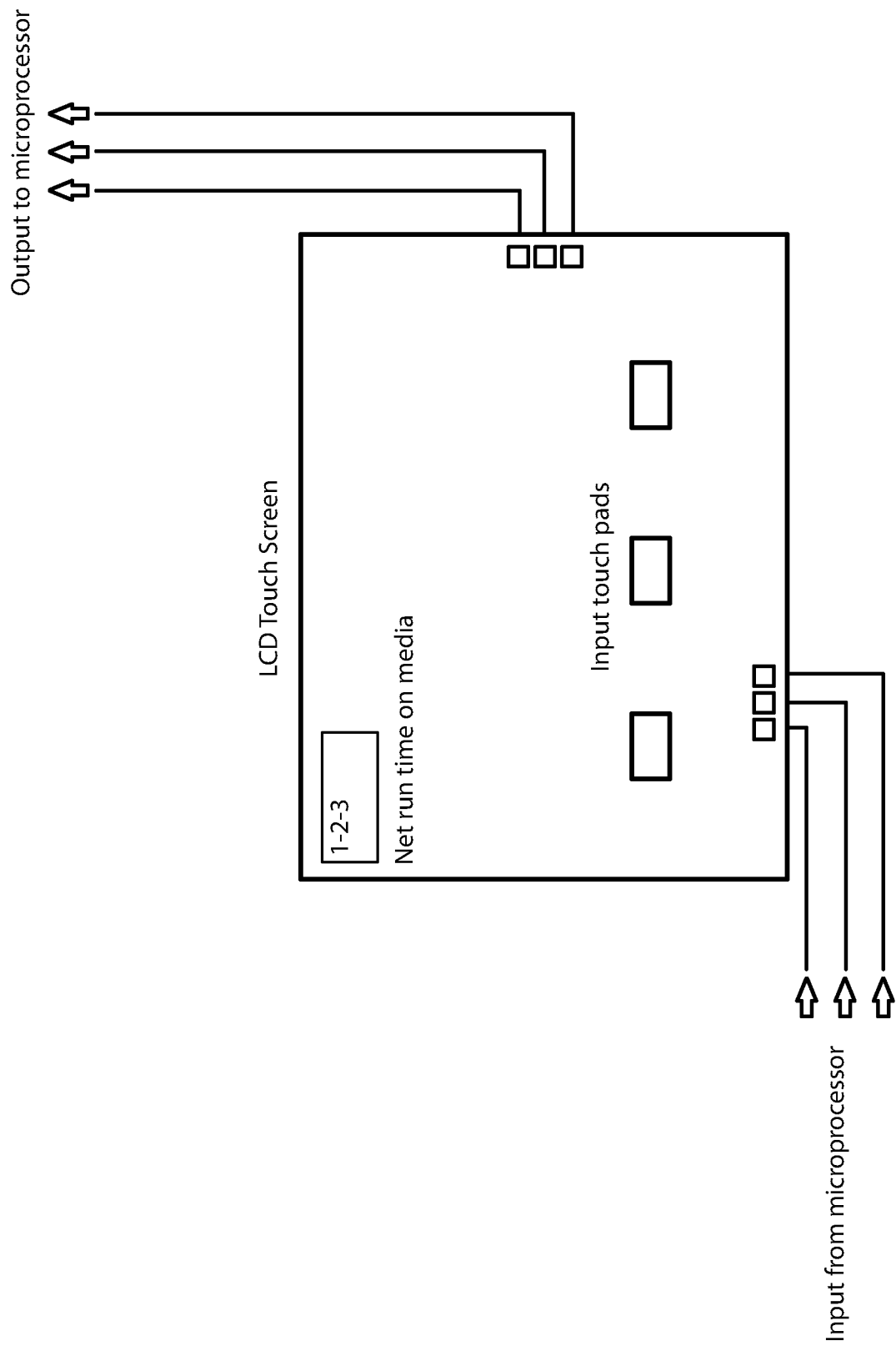
FIG. 12 is an electric schematic for a touch screen.
Figure 13:
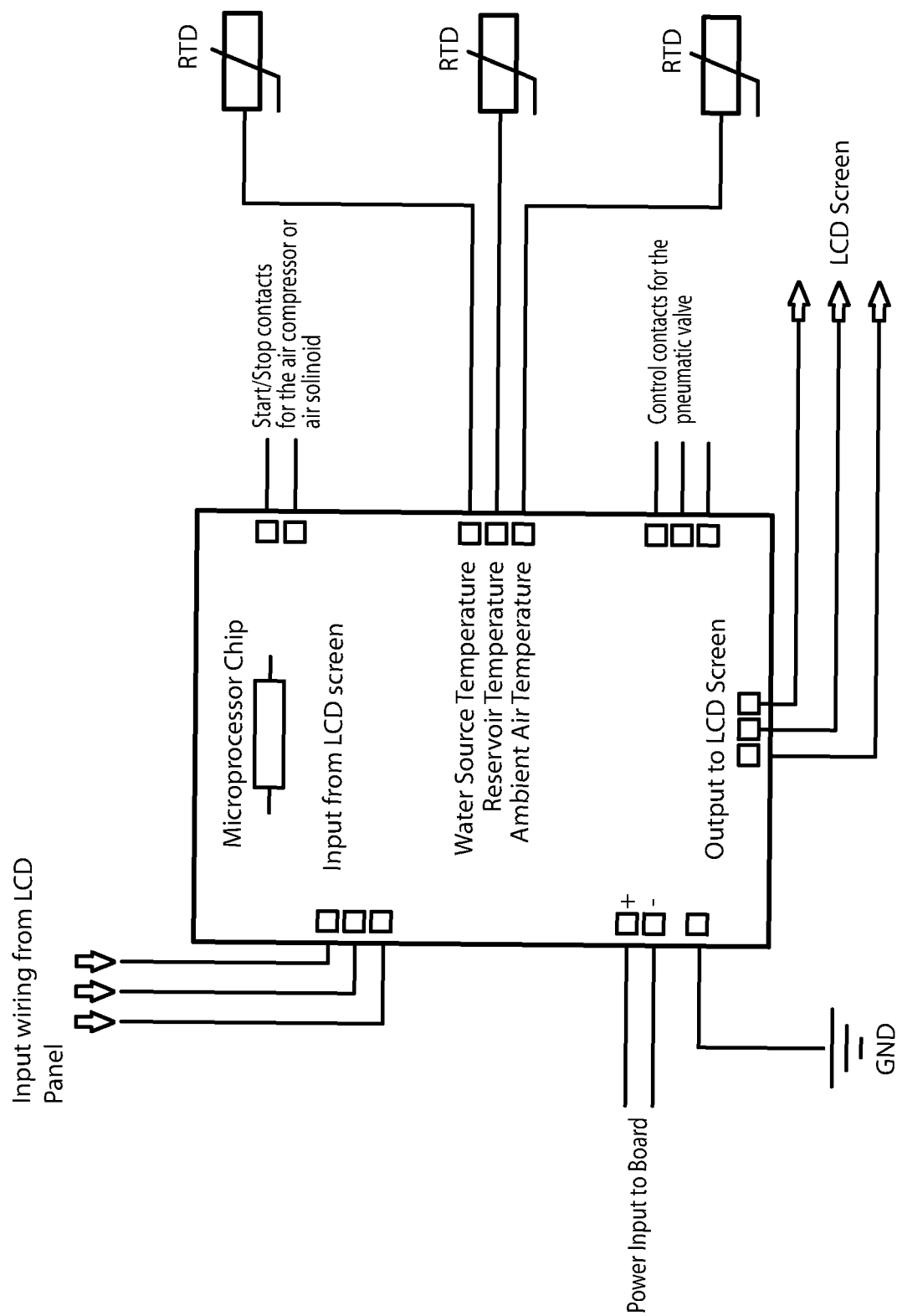
FIG. 13 is an electric schematic of a printed circuit board.

The touch screen 150 can display a variety of information, including an on status and/or an off status of the oxygen generation device 1, the temperature of the water 125 in the storage tank 120, the temperature of the fill water 128 in the fill tank 122, an operation mode of the oxygen generation device 1, an operation level of the oxygen generation device 1, an amount of the water 125 contained in the storage tank 120, an air temperature, an amount of the aquatic life located in the water 125 contained in the storage tank 120, and a net run time of the oxygen generation device 1. As shown in FIG. 12, the touch screen 150 will be connected to the power supply and a microprocessor. The touch screen 150 will send data to and receive data from the microprocessor.

The touch screen 150 would allow for numerous inputs, including the operation mode of the oxygen generation device 1, the amount of the water 125 contained in the storage tank 120, the amount of the aquatic life located in the water 125 contained in the storage tank 120, selecting between the on status and the off status of the oxygen generation device 1, run cycle information for calculating net run time, and a reset for resetting the net run timer counting feature. The run cycle information will include the oscillation rate of the pneumatic valve system 40 and a run cycle for the air compressor 10. The net run timer counting feature will alert the user to the amount of battery time used, as well as, calculate and display the number of hours the media has been in operation or actual use. The touch screen 150 can be an LCD interface screen with input touch pads. The system can allow for the temperature of the water 125 in the storage tank 120 and the temperature of the fill water 128 in the fill tank 122 to be entered manually.

The operation mode of the oxygen generation device 1 can be either an automatic mode or a manual mode. The automatic mode would use an algorithm to calculate an oxygen requirement to maintain the aquatic life located in the water 125 contained in the storage tank 120 and the operation level of the oxygen generation device 1 to produce the required oxygen requirement. The algorithm is based on a size of the storage tank 120, the amount of the water 125 contained in the storage tank 120, the temperature of the water 125 in the storage tank 120, and the amount of aquatic life located in the water 125 contained in the storage tank 120, and a size of the oxygen generation device 1.

In the manual mode, the operation level of the oxygen generation device 1 can be manually selected. In the manual mode, the operation level can be set as a percentage of operation capacity being in a range of 0 to 100 percent. Based on the selected number, the microprocessor will control how long the oxygen generation device 1 is turned on and how long the oxygen generation device 1 is turned off. The operation level of the oxygen generation device 1 can be displayed on the touch screen 150 as a range between 0 to 100 or 0 to 10 and illustrated on the touch screen 150 as bars, symbols, number, or letters. The operation level of the oxygen generation device 1 can also be represented as low, medium, high, or other desired levels.

The operation level of the oxygen generation device 1 is a range of operation capacity of the oxygen generation device 1, and would range from zero percent to one hundred percent of the capacity of the oxygen generation device 1. The operation level of the oxygen generation device 1 can be displayed on the touch screen 150 as either a percentage of operation capacity between 0 and 100 percent or as the range of bars or letters to indicated low, medium, high, or other desired levels. Based on the selected number, the microprocessor will control how long the oxygen generation device 1 is turned on and how long the oxygen generation device 1 is turned off.

The oxygen generation device can be built as a stand-alone portable unit, or in a network of components connected together to introduce substantial volumes of nanobubbles sized oxygen in order to super-oxygenate water or aqua mediums such as those found in fish tanks, baitwells, or fish livewells. This device is designed to include a unique, optional temperature compensating control system for optimum survival of aquatic life by providing a one-step selection as to whether the fish tank, baitwell, or fish livewell has the best temperature condition for oxygen saturation or if the fill medium has the best temperature for best oxygen saturation. The control system will measure temperature delta and if the delta between the two aqueous mediums is at the set point selected, will close or open a set of contacts that can start or stop a controller that operates a livewell, baitwell, or fish tank fill pump and allow for automatic change-out of the water in the fish tank, baitwell, or fish livewell to the optimum water temperature.

One of the most common methods of producing oxygen for commercial and industrial use involves a process known as Pressure Swing Absorption (PSA). Typically, a PSA system is used to scrub large quantities of air, comprised of approximately 21% oxygen, into and or across a bed of a nitrogen absorbing chemicals such as zeolite. The air used in PSA process is pumped by means of a compressor into a cylinder, or set of cylinders, of the chemical absorbent beds under a relatively low pressure, but in sufficient quantities to generate a known or desired quantity of near pure oxygen on the outlet of the scrubbing cylinder. Typical, PSA systems are sized and calibrated so as to absorb sufficient nitrogen when the air moves through the system so that the leaving stream of gas is in excess of 90% pure oxygen. When the beds of zeolite or chemicals in a PSA system have become saturated with nitrogen to the extent that there is insufficient nitrogen absorption taking place and thus a lower level of oxygen purity on the discharge of the chamber, the pressure that has been imposed on the chemical scrubbing cylinder is rapidly decreased by means of an electronic timer control system which operates an exhaust port connected to the chemical absorbent chamber, thereby causing the scrubbing chemical to give up the nitrogen that was absorbed in the pressurization and absorption process. This exhaust from the chamber is vented to the atmosphere.

Unique to this invention is how air targeted for the PSA process is introduced into the absorption media and the method used for rapid de-pressurization and regeneration. This new system and device achieves the desired result of oxygen generation via the onboard electronic timer system utilizing a specially designed and calibrated series of porting and valves in a single body construction.

This oxygen generating device and system described herein utilizes reliable PSA technology, but couples the PSA technology with electronic controls, programmable chip technology, replaceable media canisters, media canisters with maximum flow rate integral to the canister, and optional temperature sensors to insure the absolute best and optimum survival environment for aquatic life of all species. This oxygen generating device overcomes the deficiency of other devices utilized in livewells, baitwells, fish tanks, aquaponics environments, etc. which utilize electrolytic generation of microbubbles of oxygen or oxygen tank applications in that this oxygen generating device delivers a larger quantity of oxygen than other electrolytic systems commercially made for livewell and baitwell systems, plus it is capable of addressing the temperature of the water in the livewell or baitwell and can, if desired, provide an automatic means to lower the baitwell or livewell temperature when conditions are deemed to be optimum by the controller by energizing a set of control contacts inherit to the electronic control board, that can operate a pilot relay which could then operate a relay or electric contractor thus controlling the fill pump. This control function will allow for cooler water to replace the warmer water in the fish livewell, tank or baitwell system automatically when conditions are optimum to do so.

The oxygen generating device also operates at significantly lower pressures than bottled oxygen systems and is therefore safer than bottled oxygen which typically is charged to several thousand psi of pressure. Due to the oxygen demand placed on aqueous systems by large masses of fish, animal, phytoplankton, or zooplankton, where the ratio of water to fish or biological life is reduced, the ability to match or exceed the oxygen demand can be inadequate much of the time due to the inability of some oxygen generating systems ability to produce adequate quantities of nanobubbles size oxygen bubbles necessary to sustain life or at best keep dangerous stress to a minimum. The volume of oxygen introduced into fresh or salt water that is produced via electrolytic oxygen systems and rudimentary air pump systems, many times is insufficient to maintain survivable oxygen saturation levels. The amount of energy that would be required for the operation of electrolytic systems large enough to maintain healthy oxygen levels in many fish livewell and baitwell systems is to prohibitive by cost of power production or by practical space to house the devices.

For the purpose of describing the present invention, the following terms have these meanings:

"Chemical scrubbing media" means the nitrogen scrubbing chemicals resident in the 2 media chambers intended to absorb nitrogen whenever air is pumped over, through, or across the bed of chemical media under moderate or low pressure.

"Microbubble" means a bubble with a diameter less than 50 microns.

"Nanobubbles" means a bubble with a diameter less than that necessary to break the surface tension of water. Nanobubbles remain suspended in the water, giving the water an opalescent or milky appearance.

"Supersaturated" means oxygen at a higher concentration than normal calculated oxygen solubility at a particular temperature and pressure.

"Water" means any aqueous medium with resistance less than one ohm per square centimeter; that is, a medium that can support the electrolysis of water. In general, the lower limit of resistance for a medium that can support electrolysis is water containing more than 2000 ppm total dissolved solids.

Livewell, baitwell, reservoir or tank means any vessel or man-made device or construction that is intended to hold, house, or sustain aquatic life.

The oxygen generating device includes an electronic control system with circuits which comprises a timer for chemical regeneration, and an optional duel water sensing system that is thermostatically controlled by temperature sensors.

While the present invention has been illustrated and described in detail with respect to the preferred embodiments thereof, numerous modifications and variations could be made thereto by those skilled in the art without departing from the scope and spirit of the invention set forth in the claims.

The invention claimed is:

1. An oxygen generation device comprising:
   a compressed air supply device providing a compressed air;
   a housing having at least one insert chamber and an air outlet port; and
   at least one media insert containing a nitrogen absorbing media and having an inlet and an outlet, the at least one media insert is located in the at least one insert chamber of the housing, the outlet of the at least one media insert communicating with the air outlet port of the housing, the inlet of the at least one media insert selectively receiving the compressed air from compressed air supply device, the compressed air flows through the nitrogen absorbing media, and the compressed air exits the outlet of the at least one media insert as an oxygen enriched air and is released through the air outlet port of the housing;
   wherein the housing includes a lower housing having a first forward flow channel, a second forward flow channel, an inner channel, and a check valve ball;
   wherein the first forward flow channel is located between the first insert chamber and the inner channel, the first forward flow channel communicating with the air outlet port through the inner channel;
   wherein the second forward flow channel is located between the second insert chamber and the inner channel, the second forward flow channel communicating with the air outlet port through the inner channel;
   wherein the check valve ball is located in the inner channel and moveable between a first position and a second position;
   wherein, when the check valve ball is located in the first position, the check valve ball blocks the flow of the compressed air through the first forward flow channel; and
   wherein, when the check valve ball is located in the second position, the check valve ball blocks the flow of the compressed air through the second forward flow channel.

2. The oxygen generation device according to claim 1, wherein an air flow through the nitrogen absorbing media is adjustable between a nitrogen absorbing air pressure and a nitrogen releasing air pressure, the nitrogen absorbing air pressure is an air pressure that is greater than an air pressure of the nitrogen releasing air pressure,
   wherein, when the nitrogen absorbing media is subjected to the nitrogen absorbing air pressure, the nitrogen absorbing media absorbs nitrogen from the compressed air;
   wherein, when the nitrogen absorbing media is subjected to the nitrogen releasing air pressure, the nitrogen absorbing media releases nitrogen into the compressed air.

3. The oxygen generation device according to claim 1, wherein the housing has an upper housing, the lower housing, at least one housing body located between and connected to the upper housing and the lower housing, and the at least one insert chamber;
   the at least one insert chamber has at least one first end opening located in the upper housing, a hollow interior located in the at least one housing body, and at least one second end opening located in the lower housing.

4. The oxygen generation device according to claim 3, wherein the at least one insert chamber includes a first insert chamber and a second insert chamber, the at least one housing body includes a first housing body and a second housing body, the at least one first end opening of the upper housing includes two first end openings; the at least one second end opening of the lower housing includes two second end openings;
  wherein the first insert chamber is defined by a first corresponding one of the two first end openings of the upper housing, a hollow interior of the first housing body, and a first corresponding one of the two second end openings of the lower housing;
  wherein the second insert chamber is defined by a second corresponding one of the two first end openings of the upper housing, a hollow interior of the second housing body, and a second corresponding one of the two second end openings of the lower housing; and
  wherein the at least one media insert includes a first media insert and a second media insert, the first media insert is located in the first insert chamber, and the second media insert is located in the second insert chamber.

5. The oxygen generation device according to claim 4, wherein the lower housing further includes a first reverse flow channel and a second reverse flow channel, the first reverse flow channel is located between the first insert chamber and the inner channel, the second reverse flow channel is located between the second insert chamber and the inner channel;
  wherein, when the check valve ball is located in the first position, the compressed air flows through the first reverse flow channel; and
  wherein, when the check valve ball is located in the second position, the compressed air flows through the second reverse flow channel.

6. The oxygen generation device according to claim 1, further comprising a first O-ring and a second O-ring, the first O-ring sealing the first media insert with the lower housing, the first forward flow channel communicating with the outlet of the first media insert through the first O-ring, the second O-ring sealing the second media insert with the lower housing, the second forward flow channel communicating with the outlet of the second media insert through the second O-ring.

7. The oxygen generation device according to claim 5, further comprising a first O-ring and a second O-ring, the first O-ring sealing the first media insert with the lower housing, the first forward flow channel and the first reverse flow channel communicating with the outlet of the first media insert through the first O-ring, the second O-ring sealing the second media insert with the lower housing, the second forward flow channel and the second reverse flow channel communicating with the outlet of the second media insert through the second O-ring.

8. The oxygen generation device according to claim 1, further comprising an air outlet channel located in the lower housing and connected between the inner channel and the air outlet port.

9. The oxygen generation device according to claim 3, wherein at least one first end opening of the at least one insert chamber of the housing has internal threads and the at least one media insert has external threads, the at least one media insert being threadedly connected to the at least one insert chamber.

10. The oxygen generation device according to claim 1, wherein the inlet and a plurality of external threads of the at least one media insert are located on a first end thereof and the outlet of the at least one media insert is located on a second end thereof.

11. The oxygen generation device according to claim 10, wherein the at least one media insert has a pair of tabs located on the first end thereof.

12. The oxygen generation device according to claim 4, further comprising:
  a pneumatic valve system having an air inlet port, a first air outlet port, a second air outlet port, and a power plug, the first air outlet port is connected to the inlet of the first media insert, the second air outlet port is connected to the inlet of the second media insert, the air inlet port receives the compressed air from the compressed air supply device and alternatingly provides the compressed air to one of the first air outlet port and the second air outlet port,
  wherein the pneumatic valve system alternatingly provides the compressed air to one of the first media insert and the second media insert.

13. The oxygen generation device according to claim 12, further comprising:
  a printed circuit board electrically connected to and controlling the compressed air supply device and the pneumatic valve system, the printed circuit board controls a pneumatic valve circuit of the pneumatic valve system to regulate an oscillation rate for compressed air to alternatingly flow to one of the first air outlet port and the second air outlet port, the oscillation rate is a predetermined period of time.

14. The oxygen generation device according to claim 13, further comprising:
  an air cooling coil connected between the compressed air supply device and the at least one media insert, and a fan electrically connected to the printed circuit board and positioned adjacent to the air cooling coil to move air across the air cooling coil.

15. The oxygen generation device according to claim 13, further comprising:
  an on-off switch electrically connected to the circuit board to selectively engage and disengage a power supply to the circuit board.

16. The oxygen generation device according to claim claim 1, further comprising:
  a tap having a shaft, the tap sealing one end of the inner channel of the lower housing, the shaft limiting the movement of the check valve ball in the second position.

17. The oxygen generation device according to claim 1, wherein the at least one media insert has at least one screen located in a position to prevent the nitrogen absorbing media from being released, the position of the at least one screen is selected from a group of positions consisting of an interior of a connector end of the media insert, an interior of an exit end of the media insert, and a combination thereof.

18. The oxygen generation device according to claim 3, wherein the housing is made as an integral component with the upper housing, the lower housing, and the at least one housing body being formed as a single piece.

19. An oxygen generation device comprising:
  a compressed air supply device providing a compressed air;
  a housing having at least one insert chamber and an air outlet port; and
  at least one media insert containing a nitrogen absorbing media and having an inlet and an outlet, the at least one media insert is located in the at least one insert chamber of the housing, the outlet of the at least one media insert communicating with the air outlet port of the housing, the inlet of the at least one media insert selectively receiving the compressed air from compressed air supply device, the compressed air flows through the nitrogen absorbing media, and the compressed air exits the outlet of the at least one media insert as an oxygen enriched air and is released through the air outlet port of the housing;

further comprising: a first temperature sensor and a second temperature sensor, and a fill pump electrically connected to a printed circuit board, the printed circuit board electrically connected to and controlling the compressed air supply device, the first temperature sensor measuring a temperature of water in a storage tank and the second temperature sensor measuring a temperature of a fill water, when the temperature of the water located in the storage tank is higher than the temperature of the fill water, the printed circuit board controlling the fill pump to add fill water to the storage tank.

20. The oxygen generation device according to claim 4, further comprising:

a pneumatic valve system receiving an air supply from the compressed air supply device, the pneumatic valve system alternatingly provides the compressed air to one of the first media insert and the second media insert, a printed circuit board electrically connected to and controlling the compressed air supply device and the pneumatic valve system;

wherein the compressed air supply device, the housing, the at least one media insert, the pneumatic valve system, and the printed circuit board are located in a portable container.

21. The oxygen generation device according to claim 20, further comprising:

an air cooling coil connected between the compressed air supply device and the at least one media insert, and a fan electrically connected to the printed circuit board and positioned adjacent to the air cooling coil to move air across the air cooling coil.

22. The oxygen generation device according to claim 12:

wherein the pneumatic valve system alternatingly provides the compressed air to the first media insert for the oscillation rate and alternatingly provides the compressed air to the second media insert for the oscillation rate, the oscillation rate being in a range from 5-60 seconds.

23. The oxygen generation device according to claim 12:

wherein the pneumatic valve system alternatingly provides the compressed air to the first media insert for the oscillation rate and alternatingly provides the compressed air to the second media insert for the oscillation rate, the oscillation rate is 5 seconds.

24. The oxygen generation device according to claim 1:

wherein the compressed air provided by the compressed air supply device to the at least one media insert has a pressure in the range of 15-25 psi.

25. The oxygen generation device according to claim 1:

wherein the compressed air provided by the compressed air supply device to the at least one media insert has a pressure of 20 psi.

26. The oxygen generation device according to claim 1:

wherein the compressed air supply device is selected from a group consisting of an air compressor, an air tank, and a air supply system.

27. The oxygen generation device according to claim 13, further comprising:

a touch screen connected to the printed circuit board, the circuit board use data input into the touch screen to control the oxygen generation device.

28. The oxygen generation device according to claim 27:

wherein the touch screen displays a variety of information selected from a group consisting of an on status and/or an off status of the oxygen generation device, a temperature of water in a storage tank, a temperature of a fill water located in a fill tank, an operation mode of the oxygen generation device, an operation level of the oxygen generation device, an amount of the water contained in the storage tank, an air temperature, an amount of the aquatic life located in the water contained in the storage tank, a net run time of the oxygen generation device, a number of hours the at least one media insert has been in operation, and any combination thereof.

29. The oxygen generation device according to claim 27:

wherein data is input into the touch screen, the date input into the touch screen is selected from a group consisting of an on status of the oxygen generation device, an off status of the oxygen generation device, an operation mode and level of the oxygen generation device, an amount of water contained in a storage tank, an amount of aquatic life located in the water contained in the storage tank, a temperature of the water in the storage tank, a temperature of a fill water located in a fill tank, an oscillation rate of the pneumatic valve system, a reset for the net run timer counting feature, and a combination thereof.

\* \* \* \* \*